Sept. 30, 1958

C. HILLYER 2,853,900

AUTOMATIC PRECISION CONTROL DEVICE

Filed Dec. 17, 1953

INVENTOR.
CURTIS HILLYER

BY
his ATTORNEYS.

Sept. 30, 1958     C. HILLYER     2,853,900
AUTOMATIC PRECISION CONTROL DEVICE
Filed Dec. 17, 1953     3 Sheets-Sheet 2
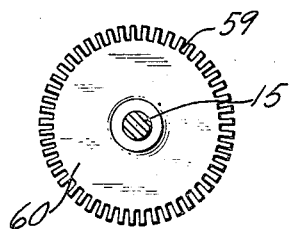
FIG. 2.
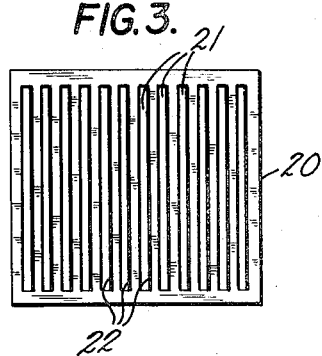
FIG. 3.
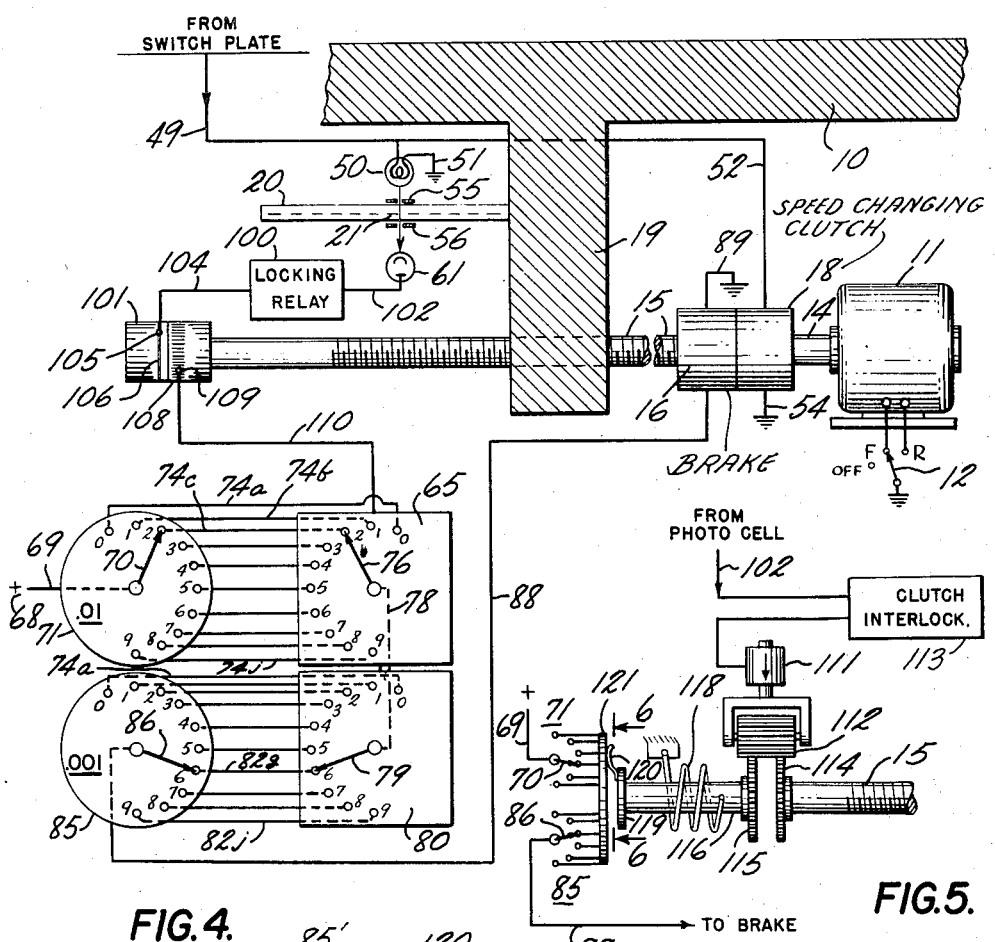
FIG. 4.     FIG. 5.
FIG. 6.
INVENTOR.
CURTIS HILLYER
BY Campbell Brumbaugh, Free & Graves
his ATTORNEYS

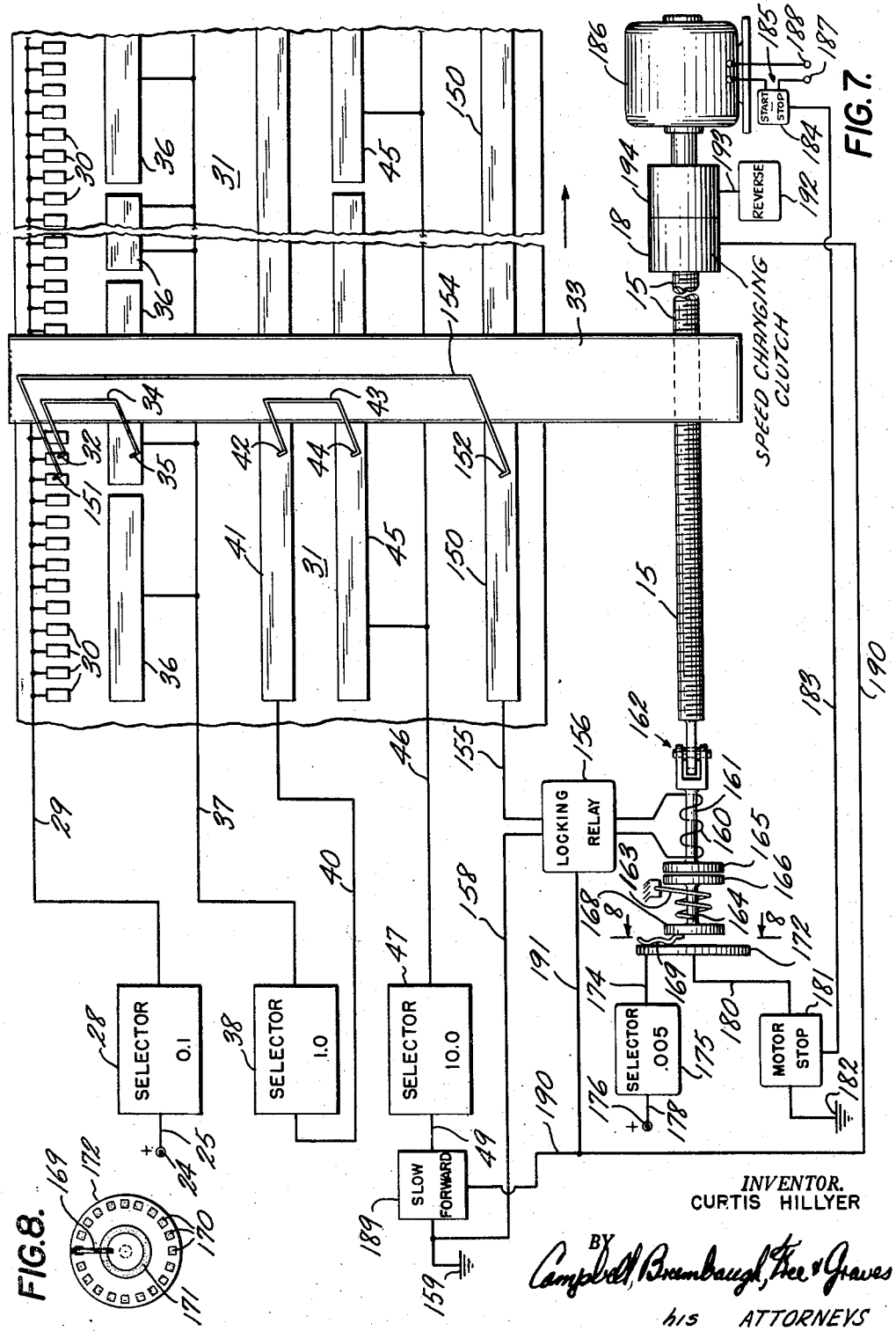

United States Patent Office 2,853,900
Patented Sept. 30, 1958

2,853,900

AUTOMATIC PRECISION CONTROL DEVICE

Curtis Hillyer, Short Hills, N. J., assignor to Hillyer Instrument Company, New York, N. Y., a corporation of Delaware Application December 17, 1953, Serial No. 398,748

13 Claims. (Cl. 74—821)

The present invention relates to automatic precision control apparatus and, more particularly, to novel apparatuses for automatically controlling movement of an object through a predetermined distance.

In the manufacturing or assembling of articles, it is highly desirable to be able to automatically position the articles that are being worked on. For example, in the drilling or boring of a metallic block, it may be necessary to move the block a precise distance between successive drilling operations by a drill mounted in a fixed position, with a high degree of accuracy, e. g., on the order of a thousandth of an inch. In order to accomplish such an operation, the block would be fixedly positioned on a table or carrier, which in turn would be moved from position to position. Normally precision movement of this character requires the use of a complicated apparatus, wherein all of the component parts must be precisely made and accurately assembled. Therefore, the cost of such an apparatus is very high. Further, it is obvious that such an apparatus will not withstand the rigors of industrial use, since the precision parts would interact and become worn, thereby rapidly making the apparatus inaccurate.

It is an object of the invention, accordingly, to provide novel apparatuses which will overcome the aforementioned disadvantages.

Another object of the invention is to provide novel and useful apparatuses for automatically controlling the movement of an object in a precise manner, having precision elements which are inexpensive and easily producible.

These and other objects may be obtained, in accordance with the invention, by a floating reference means which may be attached to and moved with the table or carrier supporting the article which is being moved. This reference means functions in cooperation with an electro-mechanical control system. When the carrier or table has moved a major portion of a predetermined distance, a speed-changing means is actuated and the speed of movement is reduced. At this time, the table or carrier continues to move in the desired direction, but at the reduced speed. As this movement continues, the operation of further elements of the electro-mechanical control system is initiated to control the remaining portion of the desired movement.

For a complete understanding of the invention reference should be made to the following detailed description taken in conjunction with the accompanying drawings, in which:

Fig. 2 is a side view of the chopper disc utilized in the apparatus of Fig. 1;

Fig. 3 is a plan view of the top surface of a floating reference plate, in accordance with the invention, showing a plurality of parallel apertures or transparent slits;

Fig. 4 is a schematic representation of a portion of an alternative embodiment of the invention;

Fig. 5 is a schematic representation of a further alternative embodiment of a portion of the control apparatus, in accordance with the invention;

Fig. 6 is a fragmentary view, taken along the line 6—6 in Fig. 5 and looking in the direction of the arrows, of a stationary contact plate;

Fig. 7 is a schematic diagram of another embodiment of the invention; and

Fig. 8 is a view, taken along the line 8—8 in Fig. 7 and looking in the direction of the arrows, of another type of stationary contact plate.

Figure 1:
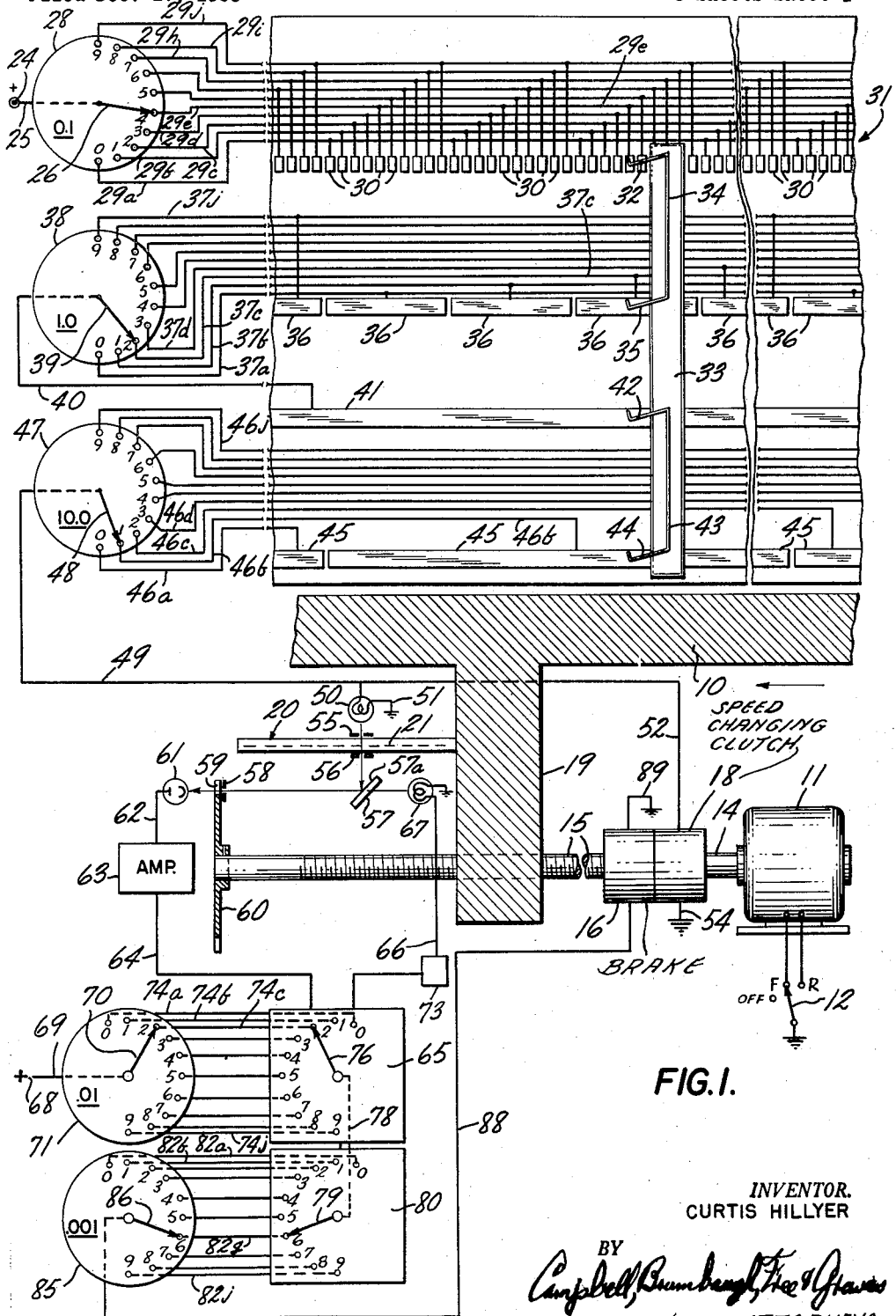
Fig. 1 is a schematic diagram of an automatic precision control apparatus, in accordance with the invention.

Referring now to Fig. 1, there is shown a controlled element 10, which may be a movable table, carrier or other device, adapted to be moved with precision over a reasonable distance. The controlled element 10 may be driven by a reversible electric motor 11 having a reversing switch 12. The motor 11 may drive a shaft 14 which may be connected to a drive screw 15 by a conventional electrically controlled brake 16 and a conventional electrically controlled speed-changing clutch 18. The drive screw 15 may engage a depending portion 19 of the controlled element 10.

A floating reference plate 20 may be attached to the depending portion 19 of the controlled element 10 in any suitable manner. The floating reference plate 20 should be of a generally opaque nature having a plurality of parallel elongated transparent slits 21, as may be best seen in Fig. 3. For example, the reference plate 20 may be made of glass with an opaque coating printed thereon from a master plate. Further, the plate 20 may consist of one elongated plate or a series of contiguous plates. The slits 21 may be spaced-apart by a predetermined fixed distance, preferably 0.1 inch between the corresponding edges 22. This distance should be precisely established.

The control circuit may be as follows: A suitable source of electrical energy 24 may be connected by a conductor 25 to a movable contact arm 26 of a conventional decade selector switch 28 having ten numbered contacts, 0-9, inclusive, mounted thereon which may correspond to tenths of an inch. The contacts of the selector switch 28 may be connected individually by a group of conductors or bus bars 29a–j, inclusive, to parallel groups of contacts 30. The contacts 30 being uniformly spaced along a contact strip 31, which may be positioned adjacent to and parallel with the path through which the controlled element 10 is moved. For example, the corresponding edges of each of the contacts 30 may preferably be spaced at intervals of 0.1 inch along the entire length of the contact strip 31, thereby defining each 0.1 of an inch through which the controlled element 10 may be moved. The contact strip 31 may have the contacts 30 and the conductors 29a–j formed thereon as a conventional printed circuit, or arranged in any other suitable manner. A brush contact 32 may be adapted to pass along the line of and make individual contact with each of the 0.1 inch contacts 30. The contact 32 may be mounted on a carrying member 33, which may be integral with or attached to some suitable part of the controlled element 10. Further, the contact 32 may be connected by a bridging conductor 34 to a brush contact 35, which may be adapted to pass over and make contact with a plurality of separate contacts 36 formed in the contact strip 31 in a line parallel to and coextensive with the 0.1 inch contacts 30.

Each of the contacts 36 may be coextensive in length with a group of 0.1 inch contacts 30 and have corresponding edges spaces at intervals of 1 inch. The 1.0 inch contacts 36 may be separated by equal intervals, which are equal to the interval between the 0.1 inch contacts 30 and coextensive with the interval between the 9 digit 0.1 inch contact 30 of one group of 0.1 inch contacts and the 0 digit 0.1 inch contact 30 of the next group.

The 1 inch contacts 36 may be arranged in groups of ten, in a manner similar to the 0.1 inch contacts 30, and be connected by conductors 37a–j, inclusive, to appropriate contacts 0–9, inclusive, on a units digit decade selector switch 38. The decade switch 38 may be of any conventional type and may include a movable contact arm 39 adapted to contact any one of the 0–9 contacts.

The movable contact arm 39 may be connected to a conductor 40 leading to a common bus or contact 41 on the contact strip 31, which may extend the full length of the path through which the controlled element 10 may be moved and be parallel to the 0.1 inch contacts 30 and the 1.0 inch contacts 36.

A brush contact 42 may be mounted on the carrying member 33 and be adapted to pass over the length of the common bus 41 and be in electrical contact with it. A bridging conductor 43 may connect the contact 42 to another brush contact 44, which may be adapted to pass over and make contact with any one of a plurality of contacts 45.

Each of the contacts 45 may be coextensive in length with a group of 1.0 inch contacts 36 and have corresponding edges spaced at intervals of 10 inches. The 10.0 inch contacts 45 may be separated by equal intervals, which are equal to the interval between the 0.1 inch contacts 30 and the 1.0 inch contacts 36, and coextensive with the interval between the 9 digit 1.0 inch contact 36 of one group of 1.0 inch contacts and the 0 digit 1.0 inch contact 45 of the next group. The 10.0 inch contacts 45 may be connected to appropriate 0–9 contacts on a tens digit decade selector switch 47 by means of conductors 46a–j, inclusive.

The tens selector switch 47 may be of any suitable type and may include a movable contact arm 48. The movable contact arm 48 may be connected by a conductor 49 through a lamp 50 to a ground or reference point 51. The conductor 49 may also be connected to a conductor 52, which may be connected through the speed-changing clutch 18 to a ground or reference point 54.

Light from the lamp 50 may be adapted to pass through a fixed slit 55, thence through the transparent slits 21 of the floating reference plate 20 and a second fixed slit 56 to a mirror 57, having a reflecting surface 57a. The mirror 57 may be of a conventional partially reflecting type wherein light impinging on one surface is partially reflected from that surface while light impinging on the opposite surface is partially transmitted through the mirror 57. The mirror may be disposed at an angle to the path of the light beam from the lamp 50 so as to direct the light beam at an angle to its original path. The light reflected from the mirror 57 may be projected through a third fixed slit 58 and the slots 59 in a chopper plate 60 to a photoelectric cell 61, which may be of any conventional type.

The chopper plate 60 may be fixedly mounted on the end of the drive screw 15 and may be made of any suitable rigid and opaque material, such as metal or plastic. The slots 59 may be spaced in the periphery of the chopper disc, as shown in Fig. 2. The exact spacing of the slots is not critical but in the preferred embodiment there should be 50 slots evenly spaced apart. As an alternative to the slots 59, a plurality of small apertures or transparent spots might be placed around the periphery of the chopper disc 60.

The photoelectric cell 61 may be connected by a conductor 62 to an amplifier 63, which in turn may be connected by a conductor 64 to any type of suitable counter means, for example conventional stepping switches 65 and 80. A conductor 66 connects an auxiliary lamp 67 to an energizing circuit 73 coupled to the stepping switch 65.

A conventional source of electrical energy 68 may be connected by the conductor 69 to a movable contact arm 70 of a fourth decade selector switch 71. The movable contact arm 70 may be adapted to contact the plurality of individual numbered contacts 0–9, inclusive, which corresponds to hundredths of an inch. The numbered contacts, in turn, may be connected by a corresponding plurality of conductors 74a–j, inclusive, to a similar plurality of contacts in the stepping switch 65, which may be numbered 0–9, inclusive. The stepping switch 65 may have a movable contact arm 76 adapted to engage the individual numbered contacts. A conductor 78 may connect the movable contact arm 76 of the stepping switch 65 to a movable contact arm 79 of the stepping switch 80. The movable contact arm 79 may be adapted to engage a plurality of numbered contacts, 0–9, inclusive, which may be connected by a corresponding plurality of conductors 82a–j, inclusive, to a similar plurality of numbered contacts in a fifth decade selector switch 85, which may be similarly numbered 0–9, inclusive, corresponding to thousandths of an inch. A movable contact arm 86 may be adapted to engage the numbered contacts of the selector switch 85. The movable contact arm 86 may be also connected through a conductor 88 and the electrically controlled brake 16 to a ground or reference point 89.

In operation, if it is desired to move the controlled element 10 a predetermined distance of, for example, 12.426 inches, the five decade selector switches may be appropriately set for the tens, units, tenths, hundredths and thousandths digits, as shown in the exemplary embodiment of Fig. 1. Having made the required setting of the selector switches, it is only necessary to close the control switch 12 of the reversible electric motor 11, in either the forward or reverse position as desired, to initiate the operation of the device, in accordance with the invention.

When the electric motor 11 starts to operate, the controlled element 10 begins to move at a predetermined rate in the desired direction, for example, to the left as shown by the arrow in Fig. 1. As the controlled element 10 moves along, the brush contacts 32, 35, 42 and 44 establish electrical contact with the contacts 30, 36, 41 and 45 of the contact strip 31. Assuming that the controlled element 10 starts from the zero position, after it moves a distance of 10 in., the brush contact 44 engages the particular 10.0 inch contact 45, which is connected by the conductor 46b to the number 1 contact of the selector switch 48. The controlled element 10 continues to move in the desired direction at the predetermined speed. When the distance traversed has increased to 12 in., the brush contact 35 engages the particular 1.0 inch contact 36 on the strip 31, which is connected by the conductor 37c to the number 2 contact of the selector switch 38. The above-mentioned engagements do not affect the operation of the precision control apparatus, but merely partially enable the energizing circuit for the lamp 50. However, as the distance traversed increases to 12.4 in., the brush contact 32 engages the particular 0.1 inch contact 30, which is connected to the number 4 contact of the selector switch 28, thereby completing the energizing circuit for the lamp 50.

Accordingly, the lamp 50 is energized from the source 24 through the conductor 25, the first movable contact arm 26, the number 4 contact of the tenths decade selector 28, the conductor 29e, the 0.1 inch contact 30, the brush contact 32, the conductor 34, the brush contact 35, the 1.0 inch contact 36, the conductor 37c, the number 2 contact of the units decade selector switch 38, the movable contact arm 39, the conductor 40, the common bus 41, the brush contact 42, the conductor 43, the brush contact 44, the 10.0 inch contact 45, the conductor 46b, the number 1 contact of the tens decade selector switch 47, the movable contact arm 48, the conductor 49, and the lamp 50 to the ground 51. The electrically controlled speed-changing clutch 18 is also energized by the same circuit through the conductor 52 and the clutch 18 to the ground 54, so as to reduce the speed of movement of the controlled element 10 to a predetermined slow speed.

At the time when the lamp 50 is energized, the light beam from the lamp will first pass through the fixed slit 55 and impinge upon an opaque portion of the floating reference plate 20. Since the controlled element 10 is continuing to move in the desired direction, although at a slower speed, the floating reference plate 20 will move under the beam of light from the lamp 50 until the beam contacts the precision control edge 22 of one of the transparent slits 21. At that point, the beam of light will be allowed to pass through the transparent slit 21 and the second fixed slit 56 to the reflecting surface 57a of the mirror 57 from whence it is directed through the fixed slit 58 and one of the slots 59 in the periphery of the chopper disc 60 to impinge upon the photoelectric cell 61.

In the exemplary embodiment of Fig. 1, the drive screw 15 preferably may have 20 threads per inch and there may be 50 slots in the periphery of the chopper disc 60. Thus it will be apparent that the chopper disc 60 will tend to break the beam of light into 1000 discrete portions for each inch of travel of the controlled element. As a result of the impingement upon the photoelectric cell 61 of the discrete portions of light, corresponding electric current impulses are created. These current impulses are amplified by the amplifier 63 and fed to the stepping switches 65 and 80 to control their operation.

The first pulse that is fed to the stepping switches 65 and 80 also acts to energize the auxiliary lamp 67 through the energizing circuit 73, which may include a suitable holding circuit for maintaining the auxiliary lamp energized during the operation of the stepping switches 65 and 80. The energization of the auxiliary lamp 67 produces a beam of light which passes through the mirror 57, the fixed slit 58, and the slots 59 in the chopper disc 60 to impinge upon the collector plate of the photoelectric cell 61, in the same manner as the light beam from the lamp 50.

The light beam from the auxiliary light source 67 functions to maintain a continuous sequence of electrical pulses from the photoelectric cell 61 to the stepping switches 65 and 80, regardless of whether the beam of light from the lamp 50 passes through the floating reference plate 20 at any time subsequent to the initial passage of the beam.

The electrical pulses cause the stepping switch 80 to operate cyclically in a step-by-step manner through its ten contacts 0–9. Upon the completion of each individual cycle of the stepping switch 80, i. e., passing from the number 9 contact to the number 0 contact, the stepping switch 65 is actuated in a step-by-step manner so as to move the contact arm 76 to the next numbered contact.

When the movable contact arms 76 and 79 of the stepping switches 65 and 80, respectively, simultaneously engage with the desired contacts, as established by the setting of the selector switches 71 and 85, the electrically controlled brake 16 is operated. The brake 16 is energized from the source 68 through the conductor 69, the movable contact arm 70, the number 2 contact of the decade selector switch 71, the conductor 74c, the movable contact arm 76, the conductor 78, the movable contact arm 79, the conductor 82g, the movable contact arm 86, the conductor 88, the electrically controlled brake 16 to the ground 89. The energization of the brake 16 stops the movement of the drive screw 15 and thus the movement of the controlled element 10. It will be apparent that any time delay that may occur in the application of the electrically controlled brake 16 or other operations may be compensated by the adjustment of the placement of the transparent slits 21 of the floating reference plate 20.

It will be obvious to those skilled in the art that if the floating reference plate 20 has the leading edges 22 of the transparent slits 21 placed thereon with a high degree of precision, it will not be necessary to utilize a precision made drive screw or chopper disc. For example, if the slots 59 in the chopper disc 60 vary in width or spacing by 10% or 20%, the variation represents only an error of 10% or 20% of .001 in.

Thus it will be apparent that the above-disclosed precision control device provides for the automatic control of the movement of the controlled element over a predetermined distance with extreme precision and yet with a minimum of precision elements.

In the alternative embodiment of Fig. 4, a locking relay 100 and a commutator 101 may be substituted for the chopper disc 60 and the auxiliary lamp 67. The circuit of Fig. 4 is substantially the same, prior to the photoelectric cell 61, as that of the embodiment in Fig. 1, except that the photoelectric cell 61 is directly responsive to the light beam from the lamp 50 after it passes through the fixed slit 56. The photoelectric cell 61 may be coupled in a suitable manner through a conducting means 102 to the locking relay 100, which in turn may be connected by the conductor 104 to a brush 105 which engages a continuous slip ring 106 of the commutator 101. A plurality of spaced-apart contacts 108 may be placed around the periphery of the outer surface of the commutator 101 and be individually connected to the continuous slip ring 106. When, as suggested in the discussion of the embodiment of Fig. 1, the drive screw 15 has 20 threads per inch, the commutator 101 may have 50 individual contacts 108 spaced around its circumference. Thus contact would be made through the commutator 101 approximately one thousand times for each inch of travel of the controlled element 10. A brush 109 may be adapted to contact the individual contacts 108 of the commutator 101, which may be connected, in turn, through the conductor 110 to the stepping switches 65 and 80.

Thus, as described with relation to Fig. 1, when the controlled element 10 has moved to the desired tenth of an inch, the lamp 50 and the electrically controlled speed-changing clutch 18 are energized and the speed-changing clutch 18 acts to reduce substantially the speed of travel of the controlled element 10. At the instant that the lamp 50 is energized, the beam of light, as in the embodiment in Fig. 1, impinges upon an opaque portion of the floating reference plate 20. Then as the controlled element 10 continues to move in the desired direction at the reduced speed, the light beam is permitted to pass through one of the transparent slits 21 and thence through the fixed slit 56 to impinge upon the collecting element of the photoelectric cell 61.

The impingement of the light beam upon the photoelectric cell 61 causes a current to flow in the conductor 102, thereby actuating the locking relay 100. The time of actuation of the locking relay 100 is controlled by the position of the precision edge 22 of the particular slit 21 through which the light beam is passing. Upon actuation, the locking relay 100 establishes a current flow through the commutator 101, which is maintained regardless of the continuance of the passage of the light beam through the floating reference plate 20. The commutator 101 converts the energizing current from the locking relay into a series of discrete pulses, as aforementioned preferably 1000 pulses per inch of movement. These pulses control the operation of the stepping relays 65 and 80 in the same manner as in the embodiment of Fig. 1.

In Fig. 5, a further alternative embodiment is shown wherein the electric current produced by the actuation of the photoelectric cell 61 may be fed through the conductor 102 to a solenoid 111. A suitable clutch interlock 113 for the electrically controlled speed-changing clutch 18 may be interposed in the conductor 102, to prevent the operation of the solenoid 111 prior to the operation of the speed-changing clutch 18. A suitable geared coupling or clutch mechanism may be controlled by the solenoid 111 to couple the drive shaft 15 to the auxiliary shaft 116. For example, the geared coupling may include a barrel gear 112, a spur gear 114, fixedly mounted on the drive screw 15, and another spur gear 115, fixedly mounted on an auxiliary shaft 116. The auxiliary shaft 116 may have a conventional return spring 118 mounted thereon and an end portion 119. A contact 120 may be attached to the end portion 119. The contact 120 may be in the form of a bridging contact and be adapted to bridge a plurality of contacts mounted on a stationary plate 121, as shown in Fig. 6.

The contacts on the plate 121 may take any suitable form, such as that of a printed circuit, wherein the individual contacts 71' and 85' may be individually connected to suitable selector switches 71 and 85, respectively, in the same manner as the plurality of contacts of the stepping switches 65 and 80 are connected to the decade selector switches 71 and 85, in the embodiments of Figs. 1 and 4.

The embodiment of Fig. 5 operates in a manner essentially similar to the embodiments of the preceding Figs. 1 and 4. When the photoelectric cell 61 is energized and the clutch interlock closed, an electric current is passed through the conductor 102 to energize the solenoid 111. This clutch interlock insures that the clutch 18 changes the speed of the drive screw 15 prior to the energization of the solenoid 111, thereby preventing damage to the gears 112, 114 and 115 which might result from engagement at high speeds. Upon the operation of the solenoid 111, the barrel gear 112 engages the gears 114 and 115, thereby causing the shaft 116 to rotate with the drive screw 15, which shall be assumed to have 10 threads per inch. The rotation of the shaft 116 causes the bridging contact 120 to move in a circular movement over the face of the plate 121 in which the preselected contacts associated with the decade selector switches 71 and 85, respectively, are located. When the contact 120 is bridged between a contact 71', corresponding to a selected hundredths contact on the switch 71, and a contact 85', corresponding to a selected thousandths contact on the switch 85, the energization circuit including the conductor 88 is completed for the brake 16.

Referring now to Fig. 7, many of the elements therein disclosed bear the same reference numerals as the corresponding elements in the system of Fig. 1 and are connected in the same manner. The conducting means 29, 37 and 46 are representative of the groups of conductors 29a–j, 37a–j, and 46a–j and serve to connect the numbered contacts in the decade selector switches 28, 38 and 47 to their associated contacts 30, 36 and 45 on the contact strip 31, in the same manner as in Fig. 1.

The contact strip 31, in addition to the contacts 30, 36, 41 and 45, may include a common bus bar or contact 150 coextensive in length and parallel to the common contact 41. Another pair of brush contacts 151 and 152 connected by a conductor 154 may be mounted on the carrying member 33. The brush contact 151 may be adapted to engage the 0.1 inch contacts 30 at a point rearward of the brush contact 32, the forward direction being designated as from left to right by means of the arrow in Fig. 7. The brush contact 152 may be adapted to pass over and engage the common contact 150.

The contact 150 may be connected by means of a conductor 155 to a locking relay means 156, which in turn may be connected by a conductor 158 to a ground or reference point 159. The locking relay 156 may be connected to solenoid control means 160 adapted to surround and control the axial displacement of a shaft 161. The shaft 161 may be coupled to the drive screw 15 by means of a mechanism for causing rotative movement of the shaft 161 with the drive screw 15 and, at the same time, permitting axial displacement of the shaft 161 relative to the drive screw 15. Such a mechanism may comprise a conventional pin and slot device 162.

The shaft 161 may be coupled to an auxiliary shaft 164 by means of a clutching mechanism, which may include a plate 165, fixedly mounted on the shaft 161, and a plate 166, fixedly mounted on one end of the auxiliary shaft 164. The auxiliary shaft 164 may have a conventional return spring 163 mounted thereon.

The other end of the shaft 164 may have a contacting means fixedly mounted thereon, which may include a plate 168 and a bridging contact 169. The bridging contact 169 may be adapted to pass over and engage a plurality of separate contacts 170 and a continuous ring contact 171 mounted in any suitable manner on a stationary plate 172, as seen in Fig. 8.

The separate contacts 170 may be connected by means of a conducting means 174 to a selector switch 175, which in turn may be connected to a suitable source of potential 176 by means of a conductor 178. Assuming that there are 10 threads per inch on the drive screw 15, there should be preferably twenty contacts 170 on the plate 172, which may be connected by individual conductors in the conductor means 174 to a corresponding group of twenty contacts in the selector means 175. The twenty contacts 170 are uniformly spaced-apart and may each be representative of a step of .005 in.

The ring contact 171 may be connected by a conducting means 180 through a Motor Stop control means 181 to a ground or reference point 182. The control means 181 may be connected by a conductor means 183 to a Start-Stop control means 184 in an energizing circuit 185 for an electric motor 186, which may be of any suitable type, but preferably a conventional braking motor adapted to stop abruptly upon the opening of its energizing circuit. The energizing circuit 185 for the motor 186 may include two terminals 187 and 188 adapted to be connected to a suitable source of electrical energy.

The conductor 49 leading from the tens decade selector switch 47 may be connected to the ground 159 through a Slow Forward control means 189, which may be adapted in any suitable manner to control the speed-changing clutch 18 and, when necessary, to reverse the direction of rotation of the drive screw 15, so that the reduced speed of movement is always in the forward direction. The control means 189 may be connected by a conductor means 190 to the speed-changing means 18. The conductor means 190 may also be connected through a conductor means 191 to the locking relay 156. A Reverse control means 192 may be connected by a conducting means 193 to a suitable mechanism 194 for reversing the direction of rotation of the drive screw 15.

The system of Fig. 7 operates in much the same manner as that of Fig. 1. When the selector switches are set for a distance greater than that at which the controlled element 10 is initially positioned and the Start-Stop control means 184 is operated, the motor 186 starts to rotate the drive screw 15 at a predetermined speed, so as to move the carrying means 33 in a forward direction (i. e., left to right).

When the brush contacts 32, 35, 42 and 44 contact the preselected contacts 30, 36, 41 and 45, the Slow Forward control means 189 is energized and operates the speed-changing means 18 to reduce the speed of movement of the controlled element 10. At the same time, the Slow Forward control means partially enables the locking relay 156.

As the carrying member 33 continues to move to the right at the reduced speed, the brush contact 151 comes in contact with the preselected 0.1 inch contact 30. Thus the locking relay 156 is energized by the circuit completed from the source 24, the conductor 25, the selector switch 28, the conductor means 29, the selected 0.1 inch contact 30, the brush contact 151, the bridging conductor 154, the brush contact 152, the common contact 150, the conductor 155, the locking relay 156 and the conductor 158 to the ground 159.

The energization of the locking relay 156 in turn energizes the solenoid control means 160, causing the clutch plate 165 to engage the plate 166. The bridging contact 169 starts to move over the contacts 170 and 171 on the stationary plate 172 under the control of drive screw 15. When the bridging contact 169 contacts the preselected contact 170, the Motor Stop control means 181 is energized and operates the Start-Stop means 184 to stop the motor 186.

Conventional holding circuits (not shown) may be utilized in the Slow Forward control means 189, the locking relay 156 and the Motor Stop control means 181, so that continued movement of the carrying member 33, after the initial actuation of these means, does not interfere with the continuance of the operation of the sysem.

When it is desired to move the controlled element 10 in a backward direction, i. e., to the left, the selectors 28, 38, 47 and 175 are set for the desired position and both the Start-Stop control means 184 and the Reverse control means 192 are actuated. The carrying member 33 now starts to move backwardly.

It will be evident that the brush contact 151 will come in contact with the selected 0.1 inch contact 30, before the brush contact 32. When this contact is made, the energizing circuit for the locking relay 156 is completed. However, the Slow Forward control means 189 has not been previously actuated. Therefore, the locking relay 156 is not partially enabled and cannot operate.

Accordingly, the carrying member 33 continues to move backwardly at the normal high speed. When the brush contacts 32, 35 and 44 contact their respective selected contacts 30, 36, and 45, the Slow Forward control means 189 is actuated. The movement of the carrying member 33 is stopped and reversed, so as to proceed in the forward direction at the reduced speed. The remaining operation is identical with that discussed relative to the normal forward movement.

Let us now consider the possibility that it is necessary to move the controlled element 10 in a forward direction but only by a few thousandths of an inch. If, after setting the selector switch 175 for the new position, the Start-Stop control means 184 is actuated to cause forward movement, the carrying member 33 would start forward at the normal high speed. Since the brush contact 32 is already past the selected 0.1 inch contact 30, the controlled element 10 would continue to move forward at the normal high speed past the desired position.

In order to return the controlled element 10 to the desired position, a reversing means, for example a conventional limit switch (not shown), may be positioned at the far forward end of the plate 31 or at some other suitable location. The limit switch may be adapted to respond to some part of the controlled element 10 or carrying member 33, when at the farthest forward point of their movement, so as to actuate the Reverse control means 192. The controlled element 10 may then move through the previously described backward operation and be brought to the desired position.

This movement to a desired position only a very small distance forward can be achieved much more rapidly by initially operating the system in the backward direction. In this latter case, the carrying member 33 moves backwardly at the normal high speed for a very small distance, until the brush contact 32 contacts the selected 0.1 inch contact 30. The system then operates forwardly at the reduced speed in the usual manner.

Thus novel and improved apparatuses have been provided, in accordance with the invention, for automatically measuring and controlling the precision movement of a controlled element over a preselected distance. It is apparent that this movement may be accomplished with great precision and with great rapidity, while only requiring essentially simple and inexpensive elements.

It will be obvious to those skilled in the art that the above embodiments are meant to be merely exemplary and that they are susceptible of modification and variation within the spirit and scope of the invention. For example, instead of using the switching means for the lamp 50, as shown in Fig. 1, a plurality of banks of interconnected rotary switches could be geared to the motor 11 in such a manner as to perform the required switching operation in the energizing circuit of the lamp 50. It also will be apparent, that any conventional form of electrically controlled clutch or coupling arrangement could be substituted for the solenoid operated coupling combination of the barrel gear 112 and the spur gears 114 and 115.

Further, the reference plate 20 might be incorporated in the main portion of the controlled element 10 instead of being attached to the depending portion 19, as shown in the drawings. This might be done in a permanent fashion or in a detachable manner, for example, by the incorporation of an opening in the controlled element, in which a reference plate could be positioned. Also, the reference plate 20 might be completely opaque with portions, corresponding to the slits 21, having a different reflectance than other portions of the plate 20, for directing the light from the lamp 50 to the photoelectric cell 61.

With regard to the number of decade selector switches, it will be apparent that the invention is not limited to the use of any particular number or type of selector switches and that any measuring system other than the disclosed decimal system would be equally applicable.

A conventional braking motor, such as described in relation to Fig. 7, may be substituted for the motor 11 and the electrical brake 16. The contact strip 31 may be mounted on the controlled element 10 with the carrying member 33 being mounted alongside the path through which the controlled element 10 is moved. Also, a Slow Forward control means may be incorporated into the system of Fig. 1. Many other substitutions and interchanges will be evident to those skilled in the art.

In order to increase the rapidity and positiveness of the actuation of the various control means, for example, the locking relay 156 and Slow Forward control means 189, gaseous discharge devices may be utilized.

Still further, a photoelectric means similar to that shown in Figs. 1 and 4, could be used with the brush contact 151 and its associated circuit in Fig. 7.

Therefore, the invention is deemed to be limited only by the appended claims.

I claim:

1. Automatic precision control apparatus for controlling the movement of a controlled element to a predetermined position, comprising a controlled element, a plurality of selector means, each of said selector means adapted to be individually set in a condition representative of a different digit included in a number corresponding to the distance through which said controlled element is to be moved, an opaque reference means mounted on said controlled element and having transparent portions therein, a light source adapted to cast a light beam upon said opaque means, an energizing circuit for said light source including a switching means in cooperation with at least one of said selector means, said switching means being responsive to the movement of said controlled element to energize said light source, means for stopping the movement of said controlled element at the predetermined position, an energizing circuit for said stopping means including at least another of said selector means and another switching means in series relation therewith, and means responsive to the passage of light through said transparent portions of said opaque reference means for controlling said another switching means.

2. Automatic precision control apparatus for controlling the movement of a controlled element to a predetermined position, comprising a controlled element, an opaque reference plate mounted on said controlled element having transparent portions therethrough adapted to pass a beam of light, a light source adapted to cast a light beam upon said opaque reference plate, drive means for moving said controlled element including speed-changing means and stopping means, an energizing circuit for said light source and said speed-changing means including at least one selector switch adapted to be set in a position representative of a major portion of the distance to the predetermined position and switching means responsive to the movement of said controlled element, an energizing circuit for said stopping means including at least another selector switch means adapted to be set in a position representative of the remaining distance to the predetermined position and at least another switching means in series with said another selector switch, and means responsive to the passage of light through said opaque reference plate to control said another switching means thereby energizing said stopping means to stop the movement of said controlled element at the predetermined position.

3. Apparatus for controlling the movement of a controlled element to a predetermined position, comprising a controlled element, drive means for moving said controlled element including speed-changing means and stopping means, an opaque reference plate mounted on said controlled element for movement therewith and having a plurality of parallel elongated transparent slits therein, said transparent slits having corresponding long sides spaced-apart at equal fixed distances, a light source adapted to cast a beam of light upon said opaque reference plate, an energizing circuit for said light source and said speed-changing means including at least one selector switch and at least one corresponding switching means, said corresponding switching means in said speed-changing means energizing circuit being responsive to the movement of said controlled element over the path to be traveled thereby, an energizing circuit for said stopping means including at least one selector switch and at least one corresponding switching means, and means responsive to a beam of light from said light source passing through one of said transparent elongated slits for controlling said corresponding switching means included in said energizing circuit for said stopping means, each of said selector switches being adapted to be set in a position representative of one digit of a number corresponding to the distance to be traveled by the controlled element.

4. Apparatus for controlling the movement of a controlled element to a predetermined position, comprising a controlled element, drive means for moving said controlled element including speed-changing means and stopping means, an opaque reference plate mounted on said controlled element for movement therewith and having a plurality of parallel elongated transparent slits therein, said transparent slits having corresponding long sides spaced-apart at equal fixed distances, a light source adapted to cast a beam of light upon said opaque reference plate, an energizing circuit for said light source and said speed-changing means including at least one selector switch and at least one corresponding switching means, said corresponding switching means being responsive to the movement of said controlled element over the path to be traveled thereby, an energizing circuit for said stopping means including at least one selector switch and at least one corresponding switching means, means responsive to a beam of light from said light source passing through one of said transparent elongated slits for producing a series of electrical pulses, and means whereby said electrical pulses control said corresponding switching means included in said energizing circuit for said stopping means, each of said selector means being adapted to be set in a position representative of one of the digits included in a number corresponding to the distance to be traveled by the controlled element.

5. Apparatus for controlling the movement of a controlled element to a predetermined position, comprising a controlled element, drive means for moving said controlled element including speed-changing means and stopping means, an opaque reference plate mounted on said controlled element for movement therewith and having a plurality of parallel elongated transparent slits therein, said transparent slits having corresponding long sides spaced-apart at equal fixed distances, a light source adapted to cast a beam of light upon said opaque reference plate, an energizing circuit for said light source and said speed-changing means including at least one selector switch and at least one corresponding switching means, said corresponding switching means being responsive to the movement of said controlled element over the path to be traveled thereby, an energizing circuit for said stopping means including at least one selector switch and at least one corresponding switching means, a relay means adapted to energize said corresponding switching means included in said energizing circuit for said stopping means, means responsive to a beam of light from said light source passing through one of said transparent elongated slits for energizing said relay means, and a commutator means for converting said energizing current from said relay means into a series of discrete electrical pulses, each of said selector means being adapted to be set in a position corresponding to one of the digits of a number representative of the distance to be traveled by the controlled element.

6. Apparatus for controlling the movement of a controlled element to a predetermined position, comprising a controlled element, drive means for moving said controlled element including speed-changing means and stopping means, an opaque reference plate mounted on said controlled element for movement therewith and having a plurality of parallel elongated transparent slits therein, said transparent slits having corresponding long sides spaced-apart at equal fixed distances, a light source adapted to cast a beam of light upon said opaque reference plate, an energizing circuit for said light source and said speed-changing means including at least one selector switch means and at least one corresponding switching means, said corresponding switching means being responsive to the movement of said controlled element over the path to be traveled thereby, an energizing circuit for said stopping means including at least one selector switch means and at least one corresponding switching means, a solenoid means, means responsive to a beam of light from said light source passing through one of said transparent elongated slits for energizing said solenoid means, an interlock in said energizing circuit for said solenoid means responsive to the operation of said speed-changing means, an auxiliary control means for controlling said corresponding switching means included in said energizing circuit for said stopping means, and a coupling mechanism operated by said solenoid means for coupling said drive means and said auxiliary control means, each of said selector switch means being adapted to be set in a position corresponding to one of the digits of a number representative of the distance to be traveled by the controlled element.

7. An automatic precision control apparatus as described in claim 3, wherein said means responsive to a beam of light from said light source passing through one of said transparent elongated slits includes a means for chopping said light beam into a continuous series of discrete portions, a photoelectric cell for converting said series of discrete portions of the light beam into a corresponding series of discrete electrical impulses for controlling said switching means included in said energizing circuit for said stopping means, an auxiliary light source adapted to maintain the continuous series of discrete portions of light without regard as to whether said light source continues to be energized and means responsive to the first electrical pulse in said series of discrete pulses to energize said auxiliary light source.

8. An automatic precision control apparatus as described in claim 3, wherein said means responsive to a beam of light from said light source passing through one of said transparent elongated slits includes a photoelectric cell for converting said light beam into an electric current, a locking relay responsive to the electric current from said photoelectric cell, an auxiliary energizing circuit for said switching means included in said stopping means energizing circuit, and means for producing electrical pulses in said auxiliary energizing circuit to operate said switching means.

9. An automatic precision control apparatus as described in claim 3, wherein said means responsive to a beam of light from said light source passing through one of said transparent elongated slits includes a photoelectric cell adapted to convert said light beam into an electrical current, a solenoid, means for energizing said solenoid by the electrical current from said photoelectric cell, interlocking means included in said circuit for energizing said solenoid, said interlocking means being responsive to the operation of said speed-changing means, an auxiliary control means for controlling said switching means in said energizing circuit for said stopping means, and coupling mechanism for coupling said auxiliary control means with said drive means, said coupling mechanism being operated by said solenoid.

10. Apparatus for controlling the movement of a controlled element to a predetermined position, comprising a controlled element, drive means for moving said controlled element including speed-changing means and stopping means, an energizing circuit for said speed-changing means including at least one selector switch and at least one corresponding switching means, said corresponding switching means of said speed-changing means energizing circuit being responsive to the movement of said controlled element, an energizing circuit for said stopping means including at least one selector switch and at least one corresponding switching means, means for selectively controlling said switching means included in said energizing circuit for said stopping means in response to the operation of said drive means, and means responsive to the continued movement of said controlled element after said speed-changing means has been energized to actuate said switching means for controlling said switching means in said stopping means energizing circuit, each of said selector switches being adapted to be set in a position representative of one digit of a number corresponding to the distance to be traveled by the controlled element.

11. Apparatus for controlling the movement of a controlled element to a predetermined position, comprising a controlled element, drive means for moving said controlled element including speed-changing means and stopping means, an energizing circuit for said speed-changing means including at least one selector switch and at least one corresponding switching means, said corresponding switching means in said speed-changing means energizing circuit being responsive to the movement of said controlled element, an energizing circuit for said braking means including at least one selector switch and at least one corresponding switching means, and another switching means responsive to the movement of said controlled element after the energization of said speed-changing means for causing said switching means included in said stopping means energizing circuit to be responsive to the operation of said drive means, each of said selector switches being adapted to be set in a position representative of one digit of a number corresponding to the distance to be traveled by the controlled element.

12. Apparatus for controlling the movement of a controlled element to a predetermined position, comprising a controlled element, drive means for moving said controlled element selectively in a backward and in a forward direction over a predetermined path at a given speed and in the forward direction at a speed less than said given speed including speed-changing means and braking means, an energizing circuit for said speed-changing means including at least one selector switch and at least one corresponding switching means, said corresponding switching means in said speed-changing means energizing circuit being responsive to the movement of said controlled element in both the forward and backward directions for reducing the speed of said drive means from said given speed to said lesser speed and causing said controlled element to be moved in the forward direction, an energizing circuit for said stopping means including at least one selector switch and at least one corresponding switching means, and means responsive to the movement of said controlled element in the forward direction at said lesser speed for causing said corresponding switching means included in said stopping means energizing circuit to be responsive to the operation of said drive means, each of said selector switches being adapted to be set in a position representative of one digit of a number corresponding to the distance to be traveled by the controlled element.

13. Apparatus for controlling the movement of a controlled element to a predetermined position, comprising a controlled element, drive means for moving said controlled element in a forward and in a backward direction over a predetermined path at a given speed and for moving said controlled element at a lesser speed in a forward direction including speed-changing means and stopping means, means for selectively controlling said drive means to move said controlled element in said forward or said backward direction at said given speed, an energizing circuit for said speed-changing means including at least one selector switch and at least one corresponding switching means, said corresponding switching means in said speed-changing means energizing circuit being responsive to the movement of said controlled element to cause said drive means to move said controlled element in said forward direction at said lesser speed, and energizing circuit for said stopping means including at least one selector switch and at least one corresponding switching means, auxiliary means for controlling the operation of said corresponding switching means included in said stopping means energizing circuit, coupling means adapted to couple said drive means to said auxiliary means, and means responsive to the movement of said controlled element in said forward direction at said lesser speed for operating said coupling means, each of said selector switches being adapted to be set in a position representative of one digit of a number corresponding to the distance to be traveled by the controlled element.

References Cited in the file of this patent

UNITED STATES PATENTS

| | | |
|---|---|---|
| 2,311,142 | Turrettini | Feb. 16, 1943 |
| 2,339,976 | Brown | Jan. 25, 1944 |
| 2,411,513 | Bergier | Nov. 26, 1946 |
| 2,427,493 | Bullard | Sept. 16, 1947 |
| 2,467,422 | Bruene | Apr. 19, 1949 |
| 2,628,539 | Neergaard | Feb. 17, 1953 |
| 2,672,067 | Hansell | Mar. 16, 1954 |
| 2,694,804 | Wagner | Nov. 16, 1954 |
| 2,710,934 | Senn | June 14, 1955 |

UNITED STATES PATENT OFFICE
CERTIFICATE OF CORRECTION

Patent No. 2,853,900                            September 30, 1958

Curtis Hillyer

It is hereby certified that error appears in the printed specification of the above numbered patent requiring correction and that the said Letters Patent should read as corrected below.

Column 13, line 58, for "said braking" read -- said stopping --.

Signed and sealed this 16th day of December 1958.

(SEAL)
Attest:

KARL H. AXLINE                                  ROBERT C. WATSON

Attesting Officer                                 Commissioner of Patents